United States Patent [19]

Kikuchi et al.

[11] Patent Number: 5,240,638
[45] Date of Patent: Aug. 31, 1993

[54] FERROELECTRIC LIQUID CRYSTAL COMPOSITION

[75] Inventors: Makoto Kikuchi, Kisarazu; Kanetsugu Terashima; Katsuyuki Murashiro, both of Ichihara, all of Japan

[73] Assignee: Chisso Corporation, Ohsaka, Japan

[21] Appl. No.: 908,854

[22] Filed: Jul. 1, 1992

Related U.S. Application Data

[63] Continuation of Ser. No. 608,386, Nov. 2, 1990, abandoned.

[30] Foreign Application Priority Data

Nov. 8, 1989 [JP] Japan .................. 1-290594

[51] Int. Cl.$^5$ .................. C09K 19/34; C09K 19/52; C09K 19/12
[52] U.S. Cl. .................. 252/299.61; 252/299.65; 252/299.01
[58] Field of Search .................. 252/299.01, 299.61, 252/299.65

[56] References Cited

U.S. PATENT DOCUMENTS 4,780,242 10/1988 Miyazawa et al. .................. 252/299
4,834,907 5/1989 Inoue et al. .................. 252/299

(List continued on next page.)

Primary Examiner—Robert L. Stoll
Assistant Examiner—Philip Tucker
Attorney, Agent, or Firm—Leydig, Voit & Mayer

[57] ABSTRACT

A ferroelectric liquid crystal composition comprising smectic liquid crystal composition(s) and optically active compounds and having a spontaneous polarization value of 20 nC cm$^{-2}$ or less and nevertheless having high rate response properties, and a light-switching element are provided, which composition comprises the following components (A), (B), (C) and (D), in 76-95, 2-10, 1-6 and 2-8 wt.%, respectively, based on the total quantity of the 4 components:

(A): at least one compound of the formula

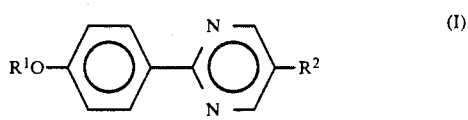

wherein $R^1$ and $R^2$ are the same or different, being 1-18C alkyl, or the formula

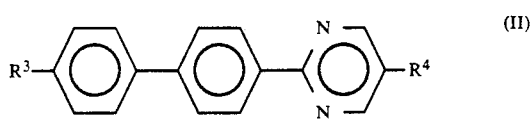

wherein $R^3$ and $R^4$ are the same or different, being 1-18C alkyl or alkoxy and having smectic C phase:

(B): an optically active compound of the formula

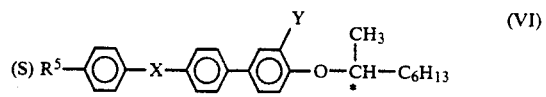

wherein $R^5$ is 1-18C alkyl or alkoxy, X is

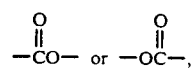

Y is halogen or H and * is asymmetric C atom;

(C): at least one optically active compound of the formulas

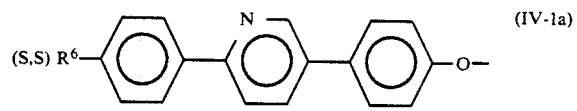

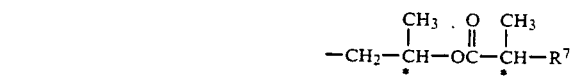

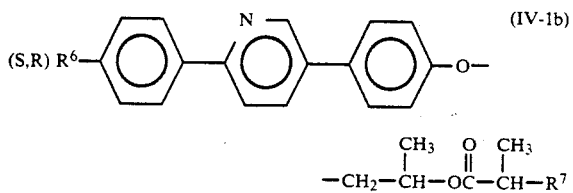

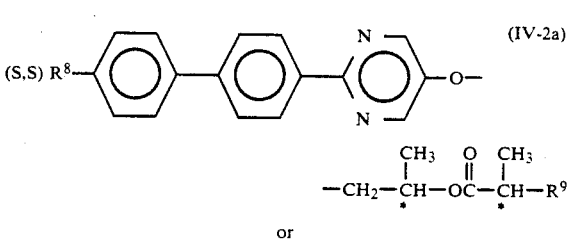

wherein $R^6$ and $R^8$ are 1-18C alkyl or alkoxy, $R^7$ and $R^9$ are 2-18C alkyl or alkoxy and * is an asymmetric C atom; and (D): at least on optically active compound formula

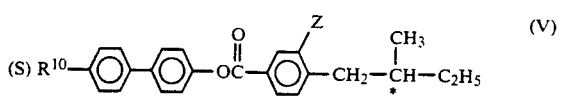

wherein $R^{10}$ is 1-18C alkyl or alkoxy, Z is H or halogen and * is an asymmetric C atom.

14 Claims, No Drawings

U.S. PATENT DOCUMENTS

| | | | |
|---|---|---|---|
| 4,882,083 | 11/1989 | Terashima et al. | 252/299 |
| 4,882,086 | 11/1989 | Terashima et al. | 252/299.61 |
| 4,892,393 | 1/1990 | Terashima et al. | 252/299.61 |
| 5,021,190 | 6/1991 | Kikuchi et al. | 252/299.61 |
| 5,047,171 | 9/1991 | Ohno et al. | 252/299.61 |
| 5,059,340 | 10/1991 | Miyazawa et al. | 252/299.61 |
| 5,064,568 | 11/1991 | Terashima et al. | 252/299.61 |
| 5,116,529 | 5/1992 | Terashima et al. | 252/299.61 |

FOREIGN PATENT DOCUMENTS

| | | |
|---|---|---|
| 63-301290 | 12/1988 | Japan . |
| 8606401 | 4/1986 | World Int. Prop. O. . |

FERROELECTRIC LIQUID CRYSTAL COMPOSITION

This application is a continuation of application Ser. No. 07/608,386, filed Nov. 2, 1990, now abandoned.

BACKGROUND OF THE INVENTION

1. Field of the Invention

This invention relates to a ferroelectric liquid crystal material. More particularly, it relates to a ferroelectric liquid crystal composition comprising smectic liquid crystal compound(s) and optically active compounds and having a spontaneous polarization value of 20 nC cm$^{-2}$ or less and nevertheless having quick response properties, and to a light-switching element using the above ferroelectric liquid crystal composition.

2. Description of the Related Art

Liquid crystal compounds have been broadly used as materials for display elements, but most of such liquid crystal display elements have a TN display mode, and as liquid crystal materials, those having a nematic phase have been used.

TN mode display devices have characteristics which result in eyes are not being strained due to a non-emissive mode, and also the power consumption is very small. However, they have the drawbacks that the response rate is low and, depending upon the angle of view the display is not always seen.

However, the mode has recently been considered for making use of its specific feature for flat display, and in particular, quick response properties and a broad angle of view have been required therefor.

In order to provide such requirements, improvement in liquid crystal materials has been attempted. However, as compared with emissive mode displays such an electro-luminescent display, etc., TN the mode display has differs considerably from the emissive mode displays in the aspects of response time and breadth of angle of view.

In order to make use of the specific features of a non-emissive mode and a small power consumption and yet secure response properties matching the emissive mode display, development of a novel liquid crystal display mode in place of the TN display mode is indispensable.

As one of such attempts, a display mode utilizing the light switching phenomenon of ferroelectric liquid crystals was proposed by N. A. Clark and S. T. Lagewall (see Applied Physics. Lett. 36, 899, 1980).

As to ferroelectric liquid crystals, their existence was announced by R. B. Meyer, et al. for the first time (see J. Phys. 36, 69, 1975), and in the aspect of liquid crystalline structure, the crystals belong to the chiral smectic C phase, chiral smectic I phase, chiral smectic F phase, chiral smectic G phase and chiral smectic H phase (hereinafter abbreviated to SC*, SF*, SI*, SG* and SF*, respectively).

In chiral smectic phases, molecules form a layer and are tilted against the layer plane and their helical axis is vertical to the layer plane.

In the chiral smectic phase, since spontaneous polarization is formed therein, when a direct current electric field is oriented parallel to the layer, molecules are reversed around their helical axis as a rotating axis, depending upon their polarity. Display elements using ferroelectric liquid crystals utilize the switching phenomenon at the time of this reversal.

Among the chiral smectic phases, the SC* phase has now been particularly noted.

As the display mode utilizing the switching phenomenon of the SC* phase, two modes are considered. One of the modes is a birefringence mode using two polarizers, and the other is a guest-host mode utilizing a dichroic dyestuff.

The display mode has specific features such as (1) a quick response rate, (2) memory properties, (3) a small dependency upon angle of view, etc., and has a possibility of high density display; hence the mode is very attractive for display elements. However, in the present situation, the display mode has a number of problems to be solved.

Recently, the relationship between the value of spontaneous polarization and memory properties and the relationship between the value of spontaneous polarization and switching of SC* phase has been discussed.

A very important problem has been observed that when a ferroelectric liquid crystal material having a spontaneous polarization value of 20 nC cm$^{-2}$ or more is placed in a cell provided with an insulator layer, multiplex drive is impossible due to the extinction of memory properties.

With regard to such abnormal behavior, it has been reported that in the case of a ferroelectric liquid crystal material having a spontaneous polarization value of 20 nC cm$^{-2}$ or more, a reverse voltage generated by an electric field (polarized field or ionized field) generated in the reverse direction to the dipole direction of liquid crystal molecules inside the cell is higher than the threshold voltage; hence switching effected by impressing a pulse voltage is impossible (for example, see Masahito Ishikawa, et.al: the 14th Liquid Crystal Symposium, Japan, p. 100–101 (1988), or J. Dijon, et.al: SID 88 DIGEST, p. 246–249 (1988)).

In general, in order to avoid the above abnormal behavior when a polyimide membrane is used as an insulator layer, the spontaneous polarization value of ferroelectric liquid crystal materials has been said to be necessary to be 20 nC cm$^{-2}$ or less, preferably 15 nC cm$^{-2}$ or less. Further, practically, in the case where the above materials are used for a display element of 640×400 lines, the following properties are particularly required:

(1) exhibiting a SC* phase within a broad temperature range including room temperature, (2) exhibiting a short response time (150 $\mu$sec or less) and (3) exhibiting superior aligning properties.

At present, however, ferroelectric liquid crystal materials (liquid crystal compositions) having a spontaneous polarization value of 20 nC cm$^{-2}$ or less and satisfying all of the above-mentioned conditions have not been obtained yet.

For example, Japanese patent application laid-open No. Sho 61-291679 and PCT international application laid-open No. WO 86/06401 (pamphlet) disclose a ferroelectric liquid crystal composition obtained by mixing an achiral 5-alkyl-2-(4-alkoxyphenyl)pyrimidine having a SC phase with an optically active compound, and also disclose that the composition has a spontaneous polarization value of 20 nC cm$^{-2}$ or less and exhibits a Sc* phase within a broad temperature range including room temperature.

Further, the former reference discloses that since the pyrimidine derivative has a very low viscosity, if it is used as a base Sc mixture in ferroelectric liquid crystal compositions, it is possible to shorten the response time of a light-switching element.

Further, the above Japanese patent application laid-open No. Sho 61-291679 also discloses that a ferroelectric liquid crystal material consisting of a 5-alkyl-2-(4'-alkylbiphenyl-4)pyrimidine, the above 5-alkyl-2-(4-alkoxyphenyl)pyrimidine and an optically-active compound also exhibits a Sc* phase within a broad temperature range including room temperature and also is effective for improving response properties.

However, the ferroelectric liquid crystal composition disclosed in the above Japanese patent application laid-open No. Sho 61-291679 and PCT international patent application laid-open No. WO 86/06401 has a spontaneous polarization value and a temperature range of the Sc* phase each satisfying the above requirements, but its response time it is still long (300 to 600$\mu$sec), that is, is not regarded as practical; hence a further improvement in response properties has been earnestly desired.

Further, U.S. Pat. No. 4,882,083 discloses a ferroelectric liquid crystal composition consisting of an achiral pyrimidine compound having a Sc phase and an optically-active compound expressed by formula (III) of the present invention and discloses that this composition exhibits a Sc* phase within a broad temperature range including room temperature and yet exhibits a very quick response rate. For example, a ferroelectric liquid crystal composition described in Example 5 of the above-noted U.S. Patent exhibits Sc* a phase within a broad temperature range of 5° to 52° C. and a response time of 100$\mu$sec, that is, satisfies it the above-mentioned requirements; thus it appears that the ferroelectric liquid crystal composition is very practical as compared with that described in the above Japanese patent application laid-open No. Sho 61-291679 or PCT international patent application laid-open No. WO 86/06401.

However, the ferroelectric liquid crystal composition described in the above U.S. Pat. No. 4,882,083 still raises a serious problem in its practical use. Namely, the composition has no cholesteric phase; thus, according to the aligning technique currently employed for TN liquid crystal materials, no uniform alignment has been obtained.

At present, as a method for aligning ferroelectric liquid crystal materials, three types of a shearing method, a temperature gradient method and a surface-treatment method have been attempted. The shearing method is directed to effecting alignment by applying a shearing stress in smectic A phase. The temperature gradient method is a similar method to an epitaxial liquid crystal growth method noting that the smectic phase can be regarded as a one-dimentional crystal. The surface treatment method, which has been practically employed for aligning TN liquid crystal materials, is a method of coating a polymer membrane such as a polyimide membrane onto the substrate of a cell and subjecting the surface to a rubbing treatment to align liquid crystal molecules. In the aspect of commercial production of liquid crystal display elements, it is preferred to align liquid crystal molecules according to the surface treatment method.

The phase transition types of ferroelectric liquid crystal materials include the following 4 types:
a) Iso phase→Sc* phase,
b) Iso phase→N* phase→Sc* phase,
c) Iso phase→$S_A$ phase→Sc* phase and
d) Iso phase→N* phase→$S_A$ phase→Sc* phase wherein Iso phase, N* phase and $S_A$ phase represent isotropic liquid phase, cholesteric phase and smectic A phase, respectively.

Among these, the type which can utilize the current aligning technique (surface treatment method) as it is, is that having a phase transition series expressed by the type d) (see Japanese patent application laid-open No. Sho 61-250086 for example). Thus, a ferroelectric liquid crystal material having the phase transition type expressed by d) has been particularly desired.

The ferroelectric liquid crystal composition disclosed in the above U.S. Pat. No. 4,882,083 has no cholesteric phase, and in order to uniformly align the composition, it is necessary to employ the shearing method or the temperature gradient method, but a long time is required for the alignment, it being impossible to effect the alignment easily Further, since the current aligning technique cannot be utilized as it is, new equipment investment is required. Thus the above composition cannot be said to be practical at all.

As apparent from the foregoing, the ferroelectric liquid crystal compositons known so far are still difficult to be regarded as practical, and hence a further improvement in the characteristics has been earnestly desired.

SUMMARY OF THE INVENTION

The present inventors have made extensive research in order to further improve the invention disclosed in the above Japanese patent application laid-open No. Sho 61-291679, and as a result, have found that when compounds described later are combined, there is obtained a ferroelectric liquid crystal composition having a spontaneous polarization value of 20 nC cm$^{-2}$ or less, exhibiting a Sc* phase within a broad temperature range including room temperature and yet quick response properties, and have completed the present invention.

As apparent from the above, the first object of the present invention is to provide a liquid crystal composition exhibiting a spontaneous polarization value of 20 nC cm$^{-2}$ or less, exhibiting a Sc* phase within a broad temperature range including room temperature, capable of aligning it according to the surface treatment method and yet having quick response properties. The second object of the present invention is to provide a light-switching element using the above-mentioned liquid crystal composition and having superior response properties.

The present invention in the first aspect resides in the item (1) mentioned below, and its embodiments resides in the items (2) to (6) mentioned below.

(1) A ferroelectric smectic C liquid crystal composition comprising the following four components of A, B, C and D, the contents of the A, B, C and D components in said composition being 76 to 95% by weight, 2 to 10% by weight, 1 to 6% by weight and 2 to 8% by weight, respectively, each based upon the total quantity of said four components:

component A being at least one compound expressed by the formula

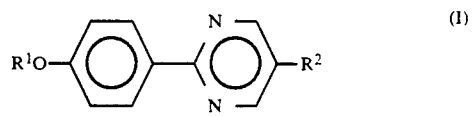

wherein $R^1$ and $R^2$ each represent the same or different alkyl group of 1 to 18 carbon atoms, or by the formula

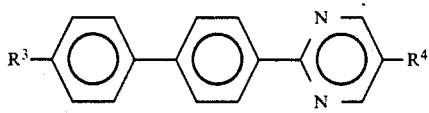

wherein $R^3$ and $R^4$ each independently represent an alkyl alkyl group or an alkoxy group, each of 1 to 18 carbon atoms, and having smectic C phase;

component B being an optically active compound expressed by the formula

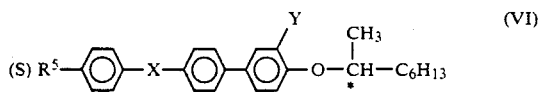

wherein $R^5$ represents an alkyl group or an alkoxy group, each of 1 to 18 carbon atoms, X represents

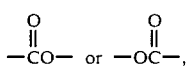

Y represents a hydrogen atom or a halogn atom and * indicates an asymmetric carbon atom;

component C being at least one compound selected from optically active compounds expressed by the following four formulas

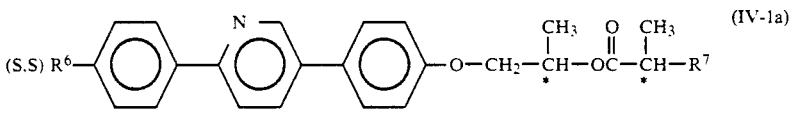

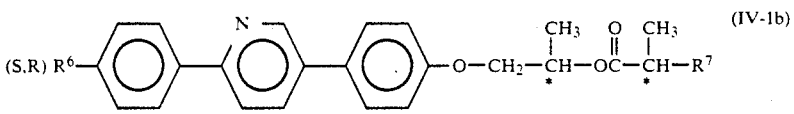

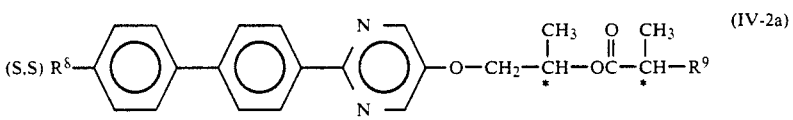

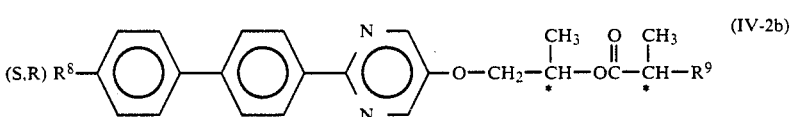

wherein $R^6$ and $R^8$ each independently represent an alkyl group or an alkoxy group each of 1 to 18 carbon atoms, $R^7$ and $R^9$ each independently represent an alkyl group of 2 to 18 carbon atoms or an alkoxy group of 2 to 18 carbon atoms and * indicates an asymmetric carbon atom; and component D being at least one compound selected from optically active compounds expressed by the formula

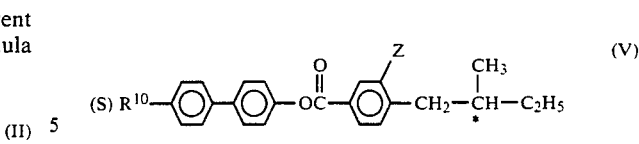

wherein $R^{10}$ represents an alkyl group or an alkoxy group, each of 1 to 18 carbon atoms, Z represents a hydrogen atom or a halogen atom and * indicates an asymmetric carbon atom.

(2) A ferroelectric smectic C liquid crystal composition according to item (1), wherein component A is at least one compound selected from compounds expressed by the formula

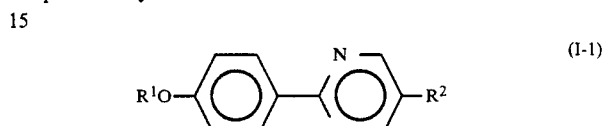

wherein $R^1$ represents a linear alkyl group of 6 to 18 carbon atoms and $R^2$ represents a linear alkyl group of 7 to 18 carbon atoms, or by the formula

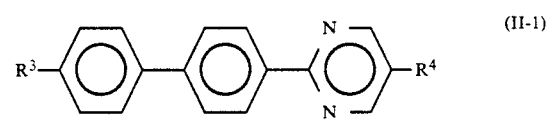

wherein $R^3$ represents a linear alkoxy group of 4 to 18 carbon atoms and $R^4$ represents a linear alkyl group of 5 to 18 carbon atoms, and having a smectic C phase.

(3) A ferroelectric smectic C liquid crystal composition according to item (1), wherein component A is at least one compound selected from compounds expressed by the formula

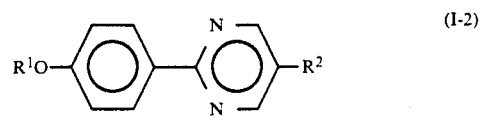

wherein $R^1$ represents a linear alkyl group of 6 to 14 carbon atoms and $R^2$ represents a linear alkyl group of 7 to 14 carbon atoms, or by the formula

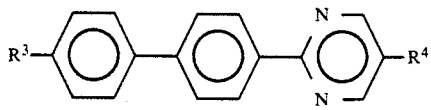

(II-2)

wherein $R^3$ represents a linear alkoxy group of 4 to 14 carbon atoms or an alkyl group of 5 to 15 carbon atoms and $R^4$ represents an alkyl group of 4 to 15 carbon atoms, and having smectic C phase.

(4) A ferroelectric smectic C liquid crystal composition according to item (1), wherein component B is at least one compound selected from optically active compounds expressed by the formula

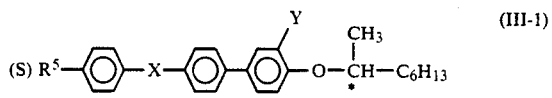

(III-1)

wherein $R^5$ represents a linear alkyl group or alkoxy group each of 4 to 12 carbon atoms and X and Y each are as defined above.

(5) A ferroelectric smectic C liquid crystal composition according to item (1), wherein component C is at least one compound selected from optically active compounds expressed by the following four formulas:

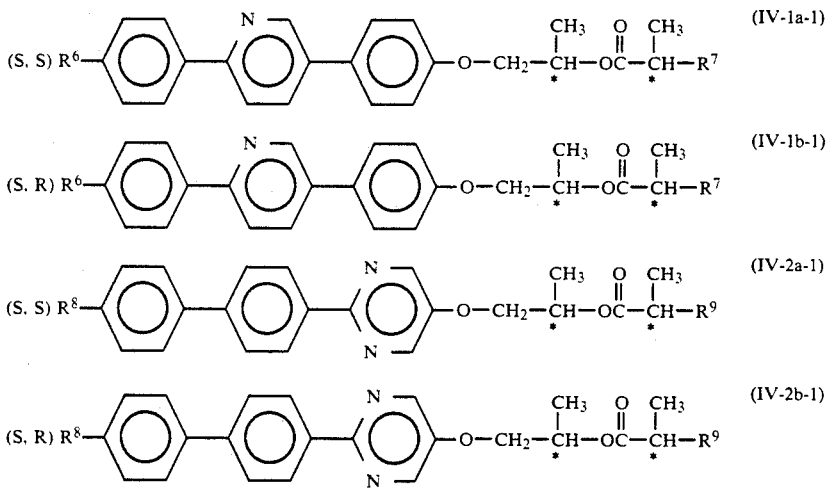

wherein $R^6$ and $R^8$ each independently represent a linear alkyl group, or alkoxy group each of 3 to 14 carbon atoms and $R^7$ and $R^9$ each independently represent a linear alkyl group or alkoxy group, each of 2 to 8 carbon atoms.

(6) A ferroelectric smectic C liquid crystal composition according to item (1), wherein component D is at least one compound selected from optically active compounds expressed by the formula

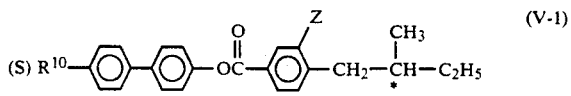

(V-1)

wherein $R^{10}$ represents a linear alkyl group or alkoxy group, each of 4 to 12 carbon atoms and Z represents a hydrogen atom, a fluorine group or a cyano group. The present invention in the second aspect (item (7)) consists in a light-switching element using a ferroelectric smectic C liquid crystal composition recited in any one of the above items (1) to (6).

DETAILED DESCRIPTION OF PREFERRED EMBODIMENTS

The present invention is based on combination of superior specific features of the components A, B, C and D expressed by the formulas (I) to (V), respectively. The superior specific features of the respective components will be described below in detail.

The compounds of the component A expressed by the formula (I) or (II) in the present invention are achiral compounds, but have Sc a phase, etc. and also have a very low viscosity; hence they are very useful as a component of a base smectic phase composition. The usefulness thereof has already been disclosed by the present inventors in the-above Japanese patent application laid-open No. Sho 61-291679, and the compounds are also very effective as a component of the ferroelectric liquid crystal composition of in the present invention.

As the two-ring pyrimidine compounds as the component A of the present invention, those of the formula (I) wherein $R^1$ represents a linear alkyl group are preferred and the $R^1$ has preferably 6 to 18 carbon atoms, more preferably 6 to 14 carbon atoms. $R^2$ in the formula (I) is preferably a linear alkyl group and its carbon numbers are preferably 7 to 18, more preferably 7 to 14. As the two-ring pyrimidine compounds, those of the formula (I) wherein the total carbon number of $R^1$ and $R^2$ is 14 to 20 are more preferred.

Further, as the three-ring pyrimidine compound, those of the formula (II) wherein $R^3$ and $R^4$ each represent a linear alkoxy group or alkyl group are preferred. Among these, those wherein $R^3$ represents an alkoxy group of 4 to 18 carbon atoms or an alkyl group of 5 to 18 carbon atoms are preferred, and those wherein $R^3$ represents an alkoxy group of 4 to 14 carbon atoms or an alkyl group of 5 to 15 carbon atoms are more preferred. Further, those wherein $R^4$ represents an alkyl group of 4 to 18 carbon atoms are preferred, and those wherein $R^4$ represents an alkyl group of 4 to 15 carbon atoms are more preferred.

In general, the compounds of the formula (I) mostly include those having a a low clearing point and hence having Sc phase within a low temperature region, while the compounds of the formula (II) mostly include those having liquid crystal phases within a relatively high temperature region.

For example, a compound of the formula (I) wherein $R^1=C_6H_{13}$ — and $R^2=C_8H_{17}$ — has phase transition points of Cr 26 Sc 47 $S_A$ 58 N 65 Iso, wherein N represents nematic phase, that is, the compound exhibits a Sc phase within a relatively low temperature range, while a compound of the formula (II) wherein $R^3=C_7H_{15}$ — and $R^4=C_8H_{17}$ — has phase transition point of Cr 58 Sc 134 $S_A$ 144 N 157 Iso, that is, the compound exhibits a Sc phase within a relatively high temperature region. Thus, when the compound expressed by the formula (I) is combined with a compound expressed by the formula (II), it is possible to obtain a base Sc mixture having a Sc phase over a broad temperature region from a low temperature region to a high temperature region.

In the present invention, the component A may be composed of either the compound of the formula (I) or the compound of the formula (II), by itself. In this case, it is possible to realize a desired liquid crystal temperature region, making use of experiences known to persons skilled in the art. For example, in the case wherein component A is desired to be composed of a compound of the formula (II) by itself, it is possible to utilize an experimentally known effect that when the number of components consisting of homologue compounds is increased, the eutectic point is lowered.

When a compound of the formula (I) and a compound of formula (II) are used together as component A, the preferable mixing ratio by weight of the compound of the formula (II) to that of formula (I) is from 1:3 to 3:1, preferably between 2:1 and 0.6:1.

Since component A plays the role of the base Sc compound in the present invention, the concentration range of component A is preferred to be 76% by weight or more based upon the total quantity of the respective components A, B, C and D.

If the content of component A is less than 76% by weight based thereupon, it often occurs that when a compound deficient in chiral smectic C phase is used as another component in a large quantity, the resulting composition has a notably narrowed Sc* phase range, or the resulting ferroelectric composition has a spontaneous polarization value exceeding 20 nC cm$^{-2}$. Further content of component A is preferred to be 95% by weight or less based upon the total quantity of the respective components A, B, C and D.

If the content of component A exceeds 95% by weight, the ratios of other components are reduced such that it may not be possible to bring the value of the helical pitch in the Sc* phase or spontaneous polarization of the resulting composition, to desired values.

Among the achiral compounds of the component A of the present invention, expressed by the formulas (I) or (II), representative compounds are shown in the following Table 1 and Table 2 as those exhibiting a Sc phase:

TABLE 1

Compounds expressed by the formula

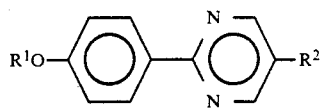

| $R^1$ | $R^2$ | $R^1$ | $R^2$ |
|---|---|---|---|
| $C_6H_{13}$— | $C_8H_{17}$— | $C_9H_{19}$— | $C_7H_{15}$— |
| " | $C_9H_{19}$— | " | $C_8H_{17}$— |
| " | $C_{10}H_{21}$— | " | $C_9H_{19}$— |
| " | $C_{11}H_{23}$— | " | $C_{10}H_{21}$— |
| $C_7H_{15}$— | $C_9H_{19}$— | $C_{10}H_{21}$— | $C_8H_{17}$— |
| " | $C_{10}H_{21}$— | $C_{11}H_{23}$— | $C_7H_{15}$— |
| " | $C_{11}H_{23}$— | " | $C_8H_{17}$— |
| $C_8H_{17}$— | $C_8H_{17}$— | $C_{12}H_{25}$— | $C_7H_{15}$— |
| " | $C_9H_{19}$— | " | $C_8H_{17}$— |
| " | $C_{10}H_{21}$— | | |
| " | $C_{11}H_{23}$— | | |

TABLE 2

Compounds expressed by the formula

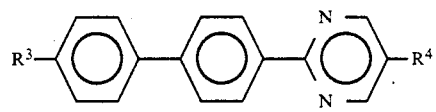

| $R^3$ | $R^4$ | $R^3$ | $R^4$ |
|---|---|---|---|
| $C_4H_9O$— | $C_4H_9$— | $C_7H_{15}O$— | $C_4H_9$— |
| $C_5H_{11}O$— | $C_4H_9$— | " | $C_4H_{11}$— |
| " | $C_5H_{11}$— | " | $C_6H_{13}$— |
| " | $C_6H_{13}$— | " | $C_7H_{15}$— |
| " | $C_7H_{15}$— | " | $C_8H_{17}$— |
| " | $C_8H_{17}$— | " | $C_9H_{19}$— |
| " | $C_9H_{19}$— | " | $C_{10}H_{21}$— |
| " | $C_{10}H_{21}$— | " | $C_{12}H_{25}$— |
| " | $C_{12}H_{25}$— | $C_8H_{17}O$— | $C_4H_9$— |
| $C_6H_{13}O$— | $C_4H_9$— | " | $C_5H_{11}$— |
| " | $C_5H_{11}$— | " | $C_6H_{13}$— |
| " | $C_6H_{13}$— | " | $C_7H_{15}$— |
| " | $C_7H_{15}$— | " | $C_8H_{17}$— |
| " | $C_8H_{17}$— | " | $C_9H_{19}$— |
| " | $C_9H_{19}$— | " | $C_{10}H_{21}$— |
| " | $C_{10}H_{21}$— | " | $C_{12}H_{25}$— |
| " | $C_{12}H_{25}$— | | |
| $C_9H_{19}O$— | $C_4H_9$— | $C_{12}H_{25}O$— | $C_4H_9$— |
| " | $C_5H_{11}$— | " | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |
| " | $C_{10}H_{21}$— | " | $C_{10}H_{21}$— |
| " | $C_{12}H_{25}$— | " | $C_{12}H_{25}$— |
| $C_{10}H_{21}O$— | $C_4H_9$— | $C_{14}H_{29}O$— | $C_4H_9$— |
| " | $C_5H_{11}$— | " | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |
| " | $C_{10}H_{21}$— | " | $C_{10}H_{21}$— |
| " | $C_{12}H_{25}$— | " | $C_{12}H_{25}$— |
| $C_{11}H_{23}O$— | $C_4H_9$— | | |
| $C_5H_{11}$— | $C_5H_{11}$— | $C_7H_{15}$— | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |
| " | $C_{10}H_{21}$— | " | $C_{10}H_{21}$— |
| " | $C_{12}H_{25}$— | " | $C_{12}H_{25}$— |
| " | $C_{14}H_{29}$— | " | $C_{14}H_{29}$— |
| $C_6H_{13}$— | $C_5H_{11}$— | $C_8H_{17}$— | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |

TABLE 2-continued

Compounds expressed by the formula

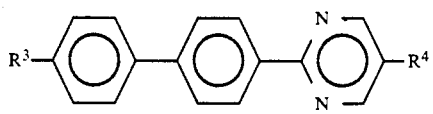

| R³ | R⁴ | R³ | R⁴ |
|---|---|---|---|
| " | C₁₀H₂₁— | " | C₁₀H₂₁— |
| " | C₁₂H₂₅— | " | C₁₂H₂₅— |
| " | C₁₄H₂₉— | " | C₁₄H₂₉— |
| C₉H₁₉— | C₅H₁₁— | C₁₂H₂₅— | C₅H₁₁— |
| " | C₆H₁₃— | " | C₆H₁₃— |
| " | C₇H₁₅— | " | C₇H₁₅— |
| " | C₈H₁₇— | " | C₈H₁₇— |
| " | C₉H₁₉— | " | C₉H₁₉— |
| " | C₁₀H₂₁— | " | C₁₀H₂₁— |
| " | C₁₂H₂₅— | " | C₁₂H₂₅— |
| " | C₁₄H₂₉— | " | C₁₄H₂₉— |
| C₁₀H₂₁— | C₅H₁₁— | C₁₄H₂₉— | C₅H₁₁— |
| " | C₆H₁₃— | " | C₆H₁₃— |
| " | C₇H₁₅— | " | C₇H₁₅— |
| " | C₈H₁₇— | " | C₈H₁₇— |
| " | C₉H₁₉— | " | C₉H₁₉— |
| " | C₁₀H₂₁— | " | C₁₀H₂₁— |
| " | C₁₂H₂₅— | " | C₁₂H₂₅— |
| " | C₁₄H₂₉— | " | C₁₄H₂₉— |

As the achiral compound expressed by formula (I) or (II) and used as component (A) of the ferroelectric liquid crystal composition of the present invention, those having a Sc phase are preferred. Even homologue compounds of formula (I) or (II) exhibiting no Sc phase may be used as a component other than component A in order to reduce the viscosity of the resulting ferroelectric liquid crystal composition or adjust its Sc* phase temperature range, as far as the quantity of the homologue compounds used is within a range in which the Sc* phase temperature range is not notably reduced.

The optically active compound expressed by formula (III) and used as component B is a chiral compound previously filed for patent by the present assignee and already laid open (e.g. see Japanese patent application laid-open Nos. Sho 61-43 and Sho 61-210056), exhibiting a Sc* phase in a high temperature region and also having a very large spontaneous polarization value.

For example, a compound of formula (III) wherein $R^6 = C_6H_{13}O—$, X =

and Y = —H has phase transition points of Cr 71 Sc* 98 N* 123 Iso and exhibits a spontaneous polarization value of 132 nC cm⁻² (T − Tc = −30° C.).

In general, among the response time ($\tau$), spontaneous polarization value (Ps) and viscosity ($\eta$) of ferroelectric liquid crystal compositions, is existent the relationship $$\tau = \frac{\eta}{Ps \cdot E}$$

wherein E represents an electric field intensity impressed onto a liquid cell. Thus, a compound having a low viscosity and also a large spontaneous polarization value is desired.

The compound expressed by formula (III), as component B, has such specific features, and in the ferroelectric liquid crystal composition of the present invention, it plays an important role in appearance of quick response properties and improvement in the upper limit temperature of the Sc* phase of the composition.

The reason why an optically active liquid crystal compound having an absolute configuration of the S type relative to the asymmetric carbon is used as component B is that it does not compensate for the spontaneous polarization induced by the component C described later. A compound of the R type as an antipode relative to the compound of formula (III) functions so that it compensates for Ps induced by component C. Therefore, the compound is unsuitable as a component of the present invention.

As compound of formula (III) as the component B, the following compounds having an absolute configuration of the S type relative to the asymmetric carbon are representative compounds:

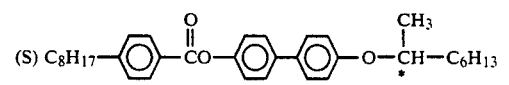

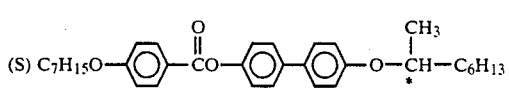

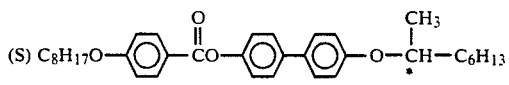

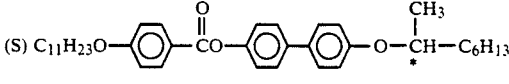

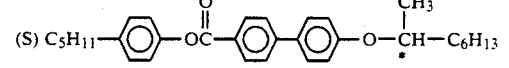

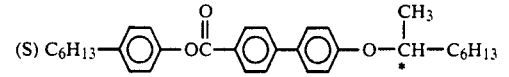

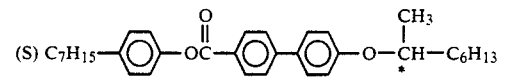

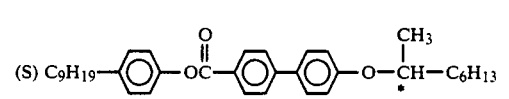

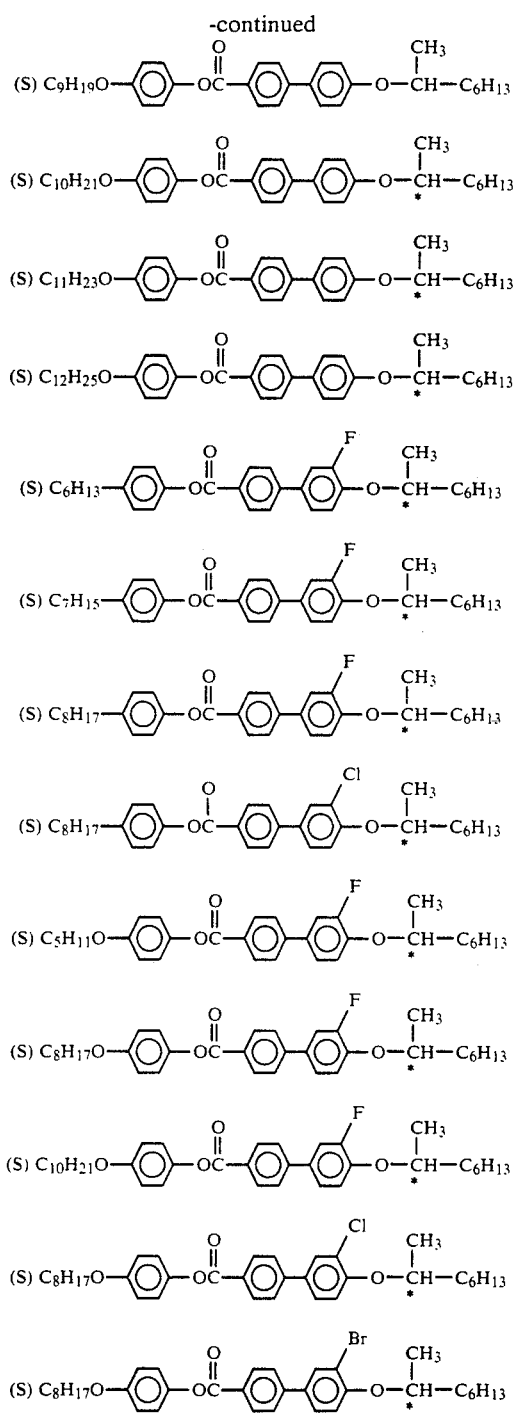

open Nos. Sho 64-50 and Sho 63-267763) and since they have a very large spontaneous polarization value, they play an important role in causing quick response properties to appear in the ferroelectric liquid crystal composition desired in the present invention (e.g. in the case of a compound of the formula (IV-2a) wherein $R^8 = C_6H_{13}O-$ and $R^9 = -OC_4H_9$ the phase transition points: Cr 88 Sc* 104 N* 113 Iso, and the spontaneous polarization value therein: 378 nC cm$^{-2}$(T-Tc = -30° C.)).

The optically active compound used as component C has an absolute configuration of the S type at the 2-C of the 2-substituted propoxy group thereof. Even when this compound exhibits no liquid crystal phase by itself, its admixture with the smectic C liquid crystal compound of formula (I) makes it possible to induce a large spontaneous polarization value in the resulting mixture.

The sense of the spontaneous polarization induced by the component C is the same as that of the spontaneous polarization brought by the component B; hence it is possible to achieve a desired Ps in the respective small quantities of component B and component C added.

The mixing proportion of the optically active compound of formula (III) as component B is preferred to be 2 to 10% by weight based upon the total quantity of the respective components A, B, C and D. When the optically active compound expressed by formulas(IV-1a) to (IV-2b) is used as component C, its content is suitably 1 to 5% by weight based upon the total quantity of the respective components. If the content of component B or component C exceeds 10% by weight or 5% by weight, respectively, it often occurs that the viscosity of the resulting composition rises or its spontaneous polarization value far exceeds 20 nC cm$^{-2}$. Further, the total quantity of component B and component C is preferred to be 14% by weight or less based upon the total quantity of all the components. In order to make the spontaneous polarization value 15 nC cm$^{-2}$ or less it is preferred that the total quantity of component B and component C not exceed 13% by weight. If the content of component B or component C is less than 2% by weight or less than 1% by weight, respectively, it is impossible to induce a sufficiently large Ps value in the resulting composition.

Compounds expressed by the formulas (IV-1a) to (IV-2b) are preferred to have Sc* phase, but even when the compounds of this group have no Sc* phase by themselves, since they have a good compatibility with the compounds of formula (I) or (II) as the component A, they, when admixed with component A, exhibit a Sc* phase over a broad temperature range and also exhibit a large Ps value. Thus, even a compound exhibiting no Sc* phase may be used for the ferroelectric liquid crystal composition desired in the present invention.

As the compounds of formulas (IV-1a) to (IV-2b) as component C, the following compounds may be enumerated as representative ones:

The compounds of formulas (IV-1a) to (IV-2b) as component C in the present invention are chiral compounds, i.e., compounds previously filed for patent by the present assignee (Japanese patent application laid-

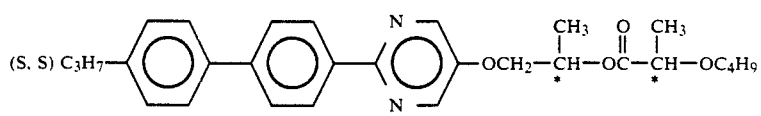

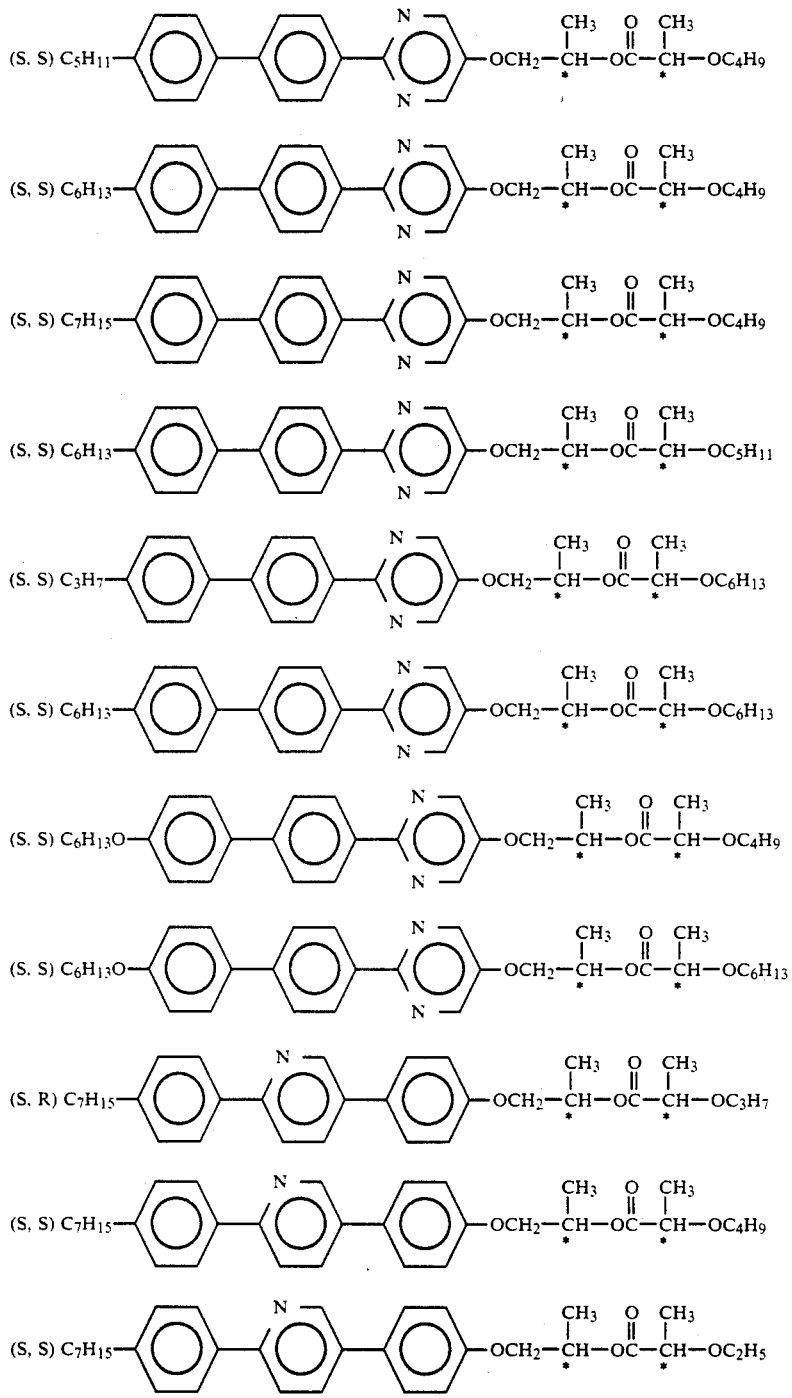

The compound of formula (V) as component D in the present invention may be prepared for exmaple according to a method disclosed in Japanese patent application laid-open No. Sho 61-210056 or Japanese patent application laid-open No. Sho 63-233966. This compound is a chiral compound, but does not have so large a spontaneous polarization value, and plays the role of adjusting the helical pitch in the present invention. The compound of formula (V) has an absolute configuration of the S type at its optically active site, and the twist sense of the helix in the Sc* phase and N* phase is right, this sense being contrary to the helical twist sense in the Sc* phase or N* phase generated by the compounds of the formulas (IV-1a) to (IV-2b) as the above component C. Thus, when the compound of formula (V) is added along with component C, it is possible to obtain a ferroelectric liquid crystal having a long helical pitch.

The liquid crystal compound of component B also has the effect of yielding a helical structure in the Sc* phase or N* phase of the resulting mixture (hereinafter referred to helical twisting power), like the compounds of component C and component D, but the helical twisting power is not as high as those of component C or of component D; hence it has no large influence upon the helical pitch in the Sc* phase or N* phase of the composition of the present invention. The helical twist sense of the component B is the same as that of the component D in N* phase. The helical twist sense of the component B compound in the Sc* phase is the same as that of component D in the case of formula (III) wherein X represents

but the above sense is contrary to that of the component D in the case of formula (III) wherein X represents

Further, the sense of the spontaneous polarization of compound of the formula (V) is of + type in the case where the absolute configuration of the optically active site is of the S type (however, the sense of the spontaneous polarization of the compound of formula (V) wherein $Z=-CN$ is of the $-$type), and is contrary to the sense of the spontaneous polarizations of the compounds expressed by the formulas (III), and (IV-1a) to (IV-2b), but the spontaneous polarization value of the compound of the formula (V) is so small (about 1 nC cm$^{-2}$) and the concentration of the compound used is also so small that the compound of the formula (V) has no adverse influence of hindering the appearance of quick response properties in the ferroelectric liquid crystal composition desired in the present invention. As the compound of the formula (V) as the component D, the following compounds may be exemplified as representative ones:

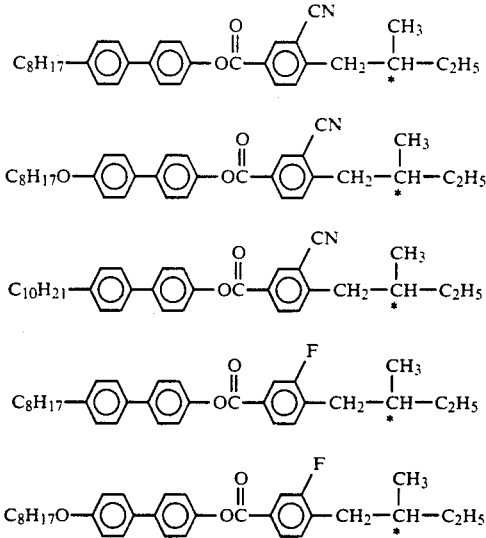

We have made extensive research into the proportion of components A, B, C and D for obtaininq the object liquid crystal composition having superior specific features, making use of the respective specific features of the components A, B, C and D. As a result, as described above, the preferable ranges of the proportions of the components are as follows:
component A: 76 to 95% by weight,
component B: 5 to 10% by weight,
component C: 1 to 5% by weight, and
component D: 2 to 8% by weight.

As described above, in the present invention, by using as the component B, an optically active compound having an absolute configuration of the S type in the asymmetric center and also using as component C, an optically active compound having a 2-substituted propoxy group and an absolute configuration of the S type at 2-C as its asymmetric center, the senses of the spontaneous polarization of both components are retained so as to be the same as each other. The object of the present invention may also be apparently achieved by replacing component B and component C with the antipodes thereof, that is, optically active compounds each having an absolute configuration of the R type in the above-mentioned asymmetric centers, respectively. The reason is that the antipode to the optically active compound of component B is known, and the sense of Ps of the antipode is contrary to that of the component B compound, and further, the antipode to the optically active compound of component C in the above-mentioned asymmetric center may be prepared by using an optically active compound of its antipode as a raw material in the same manner as that disclosed in the above-mentioned Japanese patent application laid-open Nos. Sho 64-50 and Sho 63-26776, and it can be confirmed that the sense of Ps exhibited by the optically active compound is contrary to that of the component C compound.

When liquid crystal compounds are combined together as in the present invention, it has been possible to obtain a ferroelectric liquid crystal composition having quick response properties in spite of a spontaneous polarization value of 20 nC cm$^{-2}$ or less, and yet exhibiting a SC* phase over a broad temperature range including room temperature.

Further, the light-switching element using the liquid crystal composition of the present invention has very good contrast and effects a clear switching operation and is a liquid crystal display element having very rapid response properties, both in the case of a birefringence display mode or in the case of a guest-host display mode.

EXAMPLES

The present invention will be described in more detail by way of examples, but it should not be construed to be limited thereto.

Various specific features of the composition of the present invention were measured according to the following methods:

The spontaneous polarization (Ps) was measured according to Sawyer-Tower's method. The tilt angle ($\theta$) was determined by microscopic observation of a homogeneously aligned liquid crystal cell on a rotating stage under crossed nicols in which observation an extinction position was determined by first applying across the cell above the unwinding threshold field with one polarity, followed by reversing the field polarity, an angle of rotation of the stage to obtain another extinction being $2\theta$.

The response time was sought by placing the respective compositions in a cell subjected to aligning treatment and having a distance between the electrodes, of 10 $\mu$m, impressing a square wave of a peak to peak voltage of 100 V and a frequency of 1 KHz and measuring the intensity of transmitted light at the time of the impression.

The helical pitch (p) in Sc* phase was sought by using a cell of 200 μm thick subjected to homogeneous alignment, and directly measuring the distance of the dechiralization lines under a polarizing microscope, which distance corresponded to the helical pitch.

EXAMPLES 1-5

Table 3 shows the compositions in Examples 1 to 5 of the ferroelectric liquid crystal composition of the present invention.

Table 4 shows the values of the specific features of the compositions.

In addition, the respective proportions in Table 3 refer to % by weight.

TABLE 3

| Formula | Structural formula | Example No. 1 | 2 | 3 | 4 | 5 |
|---|---|---|---|---|---|---|
| Component A | | | | | | |
| (I) | 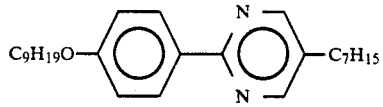 | 8 | 5 | 17 | 7.5 | 9 |
| | 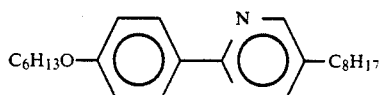 | 28 | 18 | 27 | 30 | 31.5 |
| | 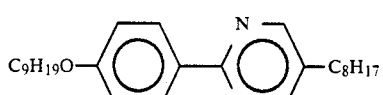 | 16 | 10 | 13 | 10 | 18 |
| (II) | 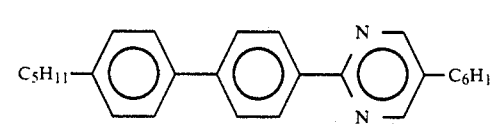 | 16 | 10 | 15 | — | 18 |
| | 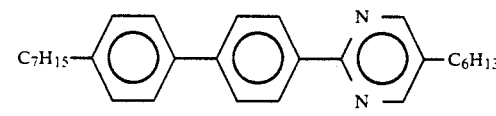 | 12 | 22 | — | — | 13.5 |
| | 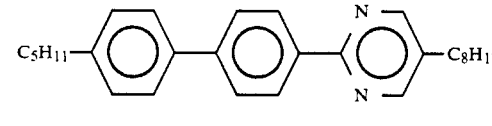 | — | 12 | 15 | 17 | — |
| | 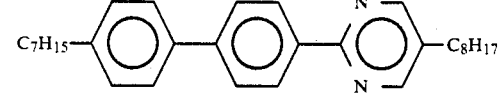 | 2.5 | 8 | — | 20 | — |
| Component B | | | | | | |
| (III) | 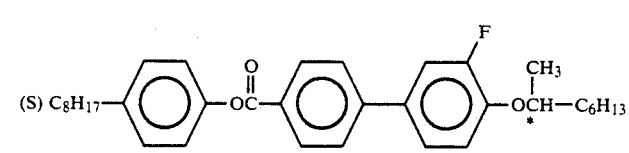 | 7.5 | 5 | — | 2.0 | — |
| | 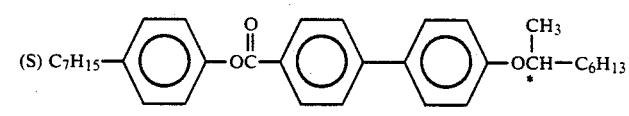 | — | — | 3 | 4.5 | 5 |
| Component C | | | | | | |
| (IV-1a) | 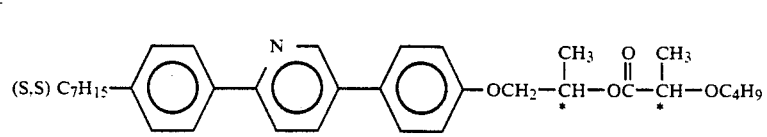 | 5 | — | 2 | 3 | 3 |

TABLE 3-continued

| Formula | Structural formula | Example No. 1 | 2 | 3 | 4 | 5 |
|---|---|---|---|---|---|---|
| (IV-2a) | (S,S) C₅H₁₁—⟨phenyl⟩—⟨phenyl⟩—⟨pyrimidine⟩—OCH₂—*CH(CH₃)—O—C(=O)—*CH(CH₃)—OC₄H₉ | — | 5 | 2 | 1 | — |
| Component D | | | | | | |
| (V) | (S) C₈H₁₇O—⟨phenyl⟩—⟨phenyl⟩—O—C(=O)—⟨phenyl-CN⟩—CH₂—*CH(CH₃)—C₂H₅ | 5 | 2.5 | — | — | — |
|  | (S) C₁₀H₂₁—⟨phenyl⟩—⟨phenyl⟩—O—C(=O)—⟨phenyl-CN⟩—CH₂—*CH(CH₃)—C₂H₅ | — | 2.5 | 6 | 5 | 2 |

TABLE 4

|  | Example No. | | | | |
|---|---|---|---|---|---|
|  | 1 | 2 | 3 | 4 | 5 |
| Phase transition point (°C.) | — | | | | |
| Cr → S$^{c*}$ | −4 | −8 | −3 | −6 | −2 |
| S$^{c*}$ → S$^A$ | 68 | 70 | 66 | 67 | 65 |
| S$^A$ → N* | 78 | 82 | 83 | 81 | 77 |
| Ch → Iso | 93 | 90 | 89 | 92 | 95 |
| Spontaneous polarization value (nCcm$^{-2}$) | 9.4 | 11.5 | 12.0 | 11.0 | 8.0 |
| Tilt angle *) (deg) | 26.3 | 27.2 | 25.0 | 26.8 | 24.0 |
| Helical pitch *) (μm) | 15.5 | 10.8 | 13.7 | 14.2 | 10.7 |
| Response time *) (μsec) | 150 | 165 | 180 | 140 | 190 |

*): measured at 25° C.

EXAMPLE 6

The ferroelectric liquid crystal composition prepared in Example 1 was placed in a cell provided with transparent electrodes of 2 μm in cell gap, having a polyimide as an agent for aligning treatment coated thereon and having the respective surfaces subjected to parallel aligning treatment by rubbing, followed by placing the resulting liquid crystal cell between two sheets of polarizers arranged in a crossed nicol state, and impressing a square wave of a low frequency of 0.5 Hz and 20 V. As a result, a very good contrast (contrast ratio: 1:15) and a clear switching operation were observed and the liquid crystal display element exhibited a response time as rapid as 80/μsec at 25° C.

EXAMPLE 7

To the ferroelectric liquid crystal composition prepared in Example 4 was added an anthraquinone dyestuff D-16 (made by BDH Co., Ltd.) expressed by the formula

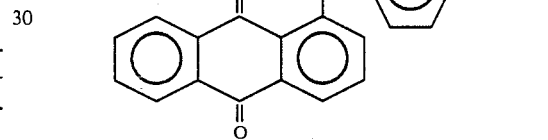

in 3% by weight to prepare a composition of the guest-host mode. This composition was placed in a cell of having a cell gap of 7 μm and subjected to the same treatment as in Example 6, followed by arranging a polarizer so that the polarization plane might be parallel to the molecular axis and impressing an alternate current of a low frequency of 0.5 Hz and 40 V. As a result, a very good contrast (contrast ratio: 1:10) and a clear switching operation were observed, and the resulting color liquid crystal display element exhibited a response time as very rapid as 130μsec.

What we claim is:

1. A ferroelectric smectic C liquid crystal composition comprising the following four components of A, B, C and D, the contents of the A, B, C and D components in said composition being, respectively 76 to 95% by weight, 2 to 10% by weight, 1 to 6% by weight and 2 to 8% by weight, each based upon the total quantity of said four components:

component A being at least one compound expressed by the formula

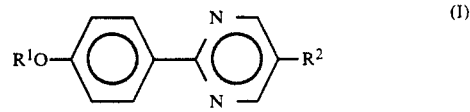

wherein R$^1$ and R$^2$ each represents the same or different alkyl group of 1 to 18 carbon atoms, or by the formula

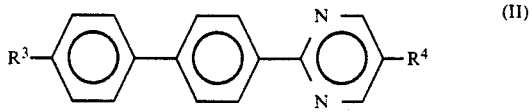

wherein $R^3$ and $R^4$ each represent the same or different alkyl group or an alkoxy group each of 1 to 18 carbon atoms, and having smectic C phase; component B being an optically active compound expressed by the formula

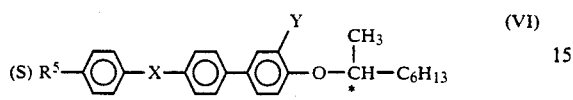

wherein $R^5$ represents an alkyl group or an alkoxy group each of 1 to 18 carbon atoms, X represents

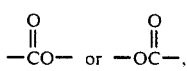

Y represents an alkyl group or an alkoxy group atom and * indicates an asymmetric carbon atom; component C being at least one compound selected from optically active compounds expressed by the following four formulas

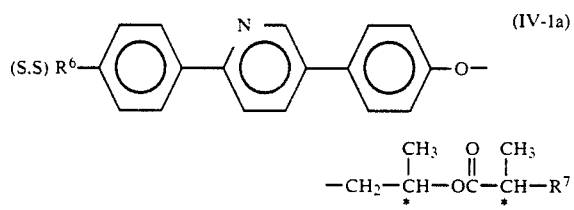

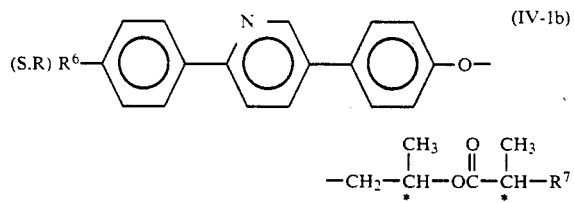

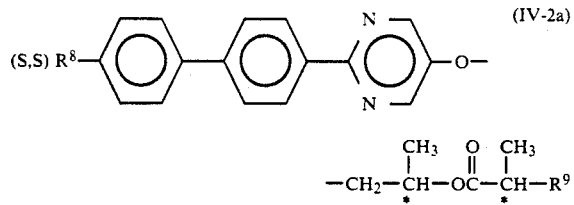

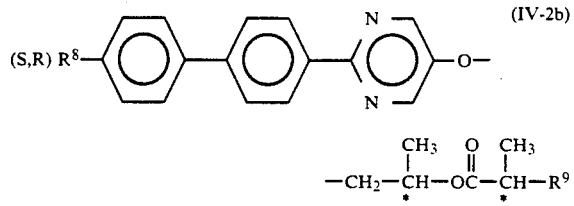

wherein $R^6$ and $R^8$ each independently represents an alkyl group or an alkoxy group, each of 1 to 18 carbon atoms, $R^7$ and $R^9$ each independently represents an alkyl group of 2 to 18 carbon atoms or an alkoxy group of 2 to 18 carbon atoms and * indicates an asymmetric carbon atom; and component D being at least one compound selected from optically active compounds expressed by the formula

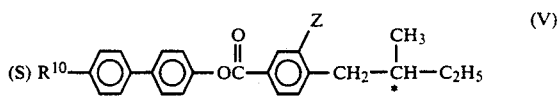

wherein $R^{10}$ represents an alkyl group or an alkoxy group each of 1 to 18 carbon atoms, Z represents a hydrogen atom or a halogen atom and * indicates an asymmetric carbon atom.

2. A ferroelectric smectic C liquid crystal composition according to claim 1, wherein said component A comprises at least one compound selected from compounds expressed by the formula

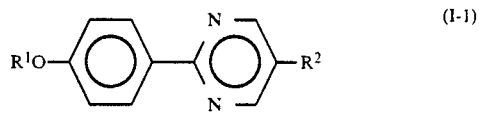

wherein $R^1$ represents a linear alkyl group of 6 to 18 carbon atoms and $R^2$ represents a linear alkyl group of 7 to 18 carbon atoms, or by the formula

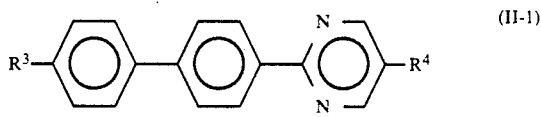

wherein $R^3$ represents a linear alkoxy group of 4 to 18 carbon atoms and $R^4$ represents a linear alkyl group of 5 to 18 carbon atoms, and having smectic C phase.

3. A ferroelectric smectic C liquid crystal composition according to claim 1, wherein said component A comprises at least one compound selected from compounds expressed by the formula

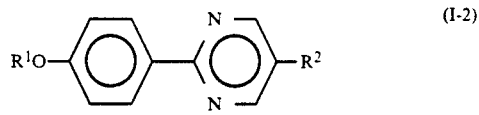

wherein $R^1$ represents a linear alkyl group of 6 to 14 carbon atoms and $R^2$ represents a linear alkyl group of 7 to 14 carbon atoms, or by the formula

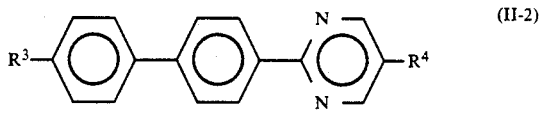

wherein $R^3$ represents a linear alkoxy group of 4 to 14 carbon atoms or an alkyl group of 5 to 15 carbon atoms and $R^4$ represents an alkyl group of 4 to 15 carbon atoms, and having smectic C phase.

4. A ferroelectric smectic C liquid crystal composition according to claim 1, wherein said component B comprises at least one compound selected from optically active compounds expressed by the formula

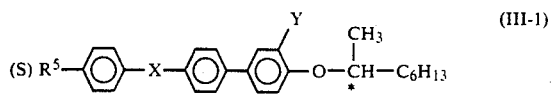
(III-1)

wherein $R^5$ represents a linear alkyl group or alkoxy group each of 4 to 12 carbon atoms.

5. A ferroelectric smectic C liquid crystal composition according to claim 1, wherein said component C comprises at least one compound selected from optically active compounds expressed by either one of the following four formulas:

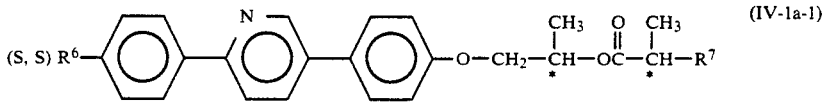
(IV-1a-1)

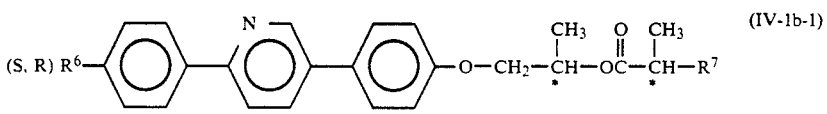
(IV-1b-1)

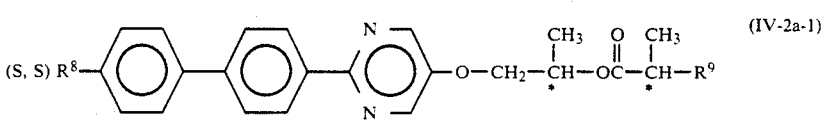
(IV-2a-1)

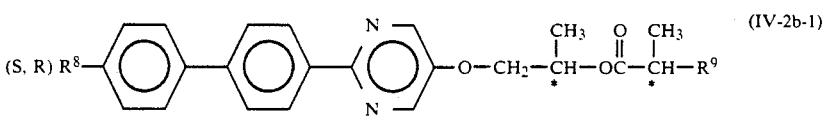
(IV-2b-1)

wherein $R^6$ and $R^7$ each independently represent a linear alkyl group, or alkoxy group each of 3 to 14 carbon atoms, and $R^8$ and $R^9$ each independently represent a linear alkyl group or alkoxy group each of 2 to 8 carbon atoms.

6. A ferroelectric smectic C liquid crystal composition according to claim 1, wherein said component D comprises at least one compound selected from optically active compounds expressed by the formula

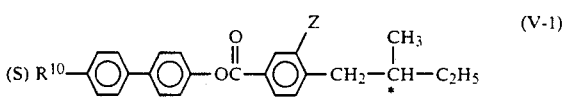
(V-1)

wherein $R^{10}$ represents a linear alkyl group or alkoxy group, each of 4 to 12 carbon atoms and Z represents a hydrogen atom or a fluorine group.

7. A light-switching element using a ferroelectric smectic C liquid crystal composition as set forth in claim 1.

8. A light-switching element using a ferroelectric smectic C liquid crystal composition as set forth in claim 2.

9. A light-switching element using a ferroelectric smectic C liquid crystal composition as set forth in claim 3.

10. A light-switching element using a ferroelectric smectic C liquid crystal composition as set forth in claim 4.

11. A light-switching element using a ferroelectric smectic C liquid crystal composition as set forth in claim 5.

12. A light-switching element using a ferroelectric smectic C liquid crystal composition as set forth in claim. 6.

13. A ferroelectric liquid crystal composition according to claim 1, wherein said composition has a spontaneous polarization value of 20 $nC/cm^2$ or less.

14. A light-switching element using a ferroelectric smectic C liquid crystal composition as set forth in claim 13.

* * * * *

UNITED STATES PATENT AND TRADEMARK OFFICE
CERTIFICATE OF CORRECTION

PATENT NO. : 5,240,638
DATED : August 31, 1993
INVENTOR(S) : Kikuchi et al.

It is certified that error appears in the above-indentified patent and that said Letters Patent is hereby corrected as shown below:

Claim 1, column 22, line 51, after "respectively" insert --,--;

Claim 1, column 23, line 7, change "represent" to --represents--;

Claim 1, column 23, line 25, change "an alkyl group or an alkoxy group" to --a hydrogen atom or a halogen--.

Signed and Sealed this

Twenty-sixth Day of April, 1994

Attest:

BRUCE LEHMAN

*Attesting Officer*  *Commissioner of Patents and Trademarks*